United States Patent

Park et al.

[11] Patent Number: 5,946,706
[45] Date of Patent: Aug. 31, 1999

[54] PROGRAMMABLE CONTROL SEQUENCER OF DISK CONTROLLER AND METHOD FOR MAP ALLOCATION THEREFOR

[75] Inventors: Chan-Geu Park, Seoul; Jun-Jin Kong, Kyungki-do; Jung-Il Park, Kyungki-do; Yong-Woo Park, Kyungki-do, all of Rep. of Korea

[73] Assignee: SamSung Electronics Co., Ltd., Kyungki-do, Rep. of Korea

[21] Appl. No.: 08/777,137

[22] Filed: Dec. 30, 1996

[30] Foreign Application Priority Data

Dec. 30, 1995 [KR] Rep. of Korea ................. 95-72287

[51] Int. Cl.⁶ ........................................... G06F 13/10
[52] U.S. Cl. ................................... 711/111; 711/167
[58] Field of Search ............................. 711/111, 105, 711/167, 154

[56] References Cited

U.S. PATENT DOCUMENTS

| | | |
|---|---|---|
| 4,050,094 | 9/1977 | Bourke . |
| 4,080,651 | 3/1978 | Cronshaw et al. . |
| 4,583,162 | 4/1986 | Prill . |
| 4,866,601 | 9/1989 | DuLac et al. ........................ 711/111 |
| 4,884,197 | 11/1989 | Sachs et al. . |
| 4,918,587 | 4/1990 | Pechter et al. . |
| 5,261,058 | 11/1993 | Squires et al. ...................... 395/821 |
| 5,274,773 | 12/1993 | Squires et al. ...................... 395/858 |
| 5,412,666 | 5/1995 | Squires et al. ...................... 371/37.4 |
| 5,422,763 | 6/1995 | Harris . |
| 5,530,825 | 6/1996 | Black et al. . |
| 5,548,751 | 8/1996 | Ryu et al. . |
| 5,559,982 | 9/1996 | Wideman ............................ 711/111 |
| 5,564,118 | 10/1996 | Steely, Jr. et al. . |
| 5,589,998 | 12/1996 | Yu . |
| 5,592,348 | 1/1997 | Strang, Jr. . |
| 5,596,736 | 1/1997 | Kerns . |
| 5,596,737 | 1/1997 | Strang, Jr. . |
| 5,610,808 | 3/1997 | Squires et al. ...................... 364/131 |
| 5,640,600 | 6/1997 | Satoh et al. ......................... 395/853 |
| 5,829,049 | 10/1998 | Walker ................................. 711/168 |

FOREIGN PATENT DOCUMENTS

| | | |
|---|---|---|
| 0 517 473 A2 | 9/1992 | European Pat. Off. . |
| 0689207 A1 | 12/1995 | European Pat. Off. . |
| 4006986 A1 | 9/1990 | Germany . |

OTHER PUBLICATIONS

Dunnion, D., Stropoli, M., Design a Hard-dsk Controller with DSP Techniques, Electronics Design, pp. 117–119, and 121, Sep. 22, 1988.

*Primary Examiner*—John W. Cabeca
*Assistant Examiner*—Christopher S Chow
*Attorney, Agent, or Firm*—Robert E. Bushnell, Esq.

[57] ABSTRACT

An improved programmable control sequencer and a method for its map allocation capable of reducing a size of program RAM in a disk controller, of a magnetic disk drive storage system. The programmable control sequencer includes a program random access memory (RAM) having a 16×7 bit size of storage area, provided with a branch/data selection field, an encoded next address/count field and an output field. The branch/data selection field has either one of a branch condition or count field enable information and selects a given data register to compare data read out from a disk with data of the selected data register. The encoded next address/count field has an encoded value of either a next address or a count value according to the branch condition. The output field is used for testing a synchronization outside of said programmable control sequencer. An address generator generates an address for accessing the program random access memory in accordance with the information of the branch/data selection field and the encoded next address/count field. A decoder decodes the encoded next address/count value to provide the decoded information to the address generator. A decoder selection decoder decodes the information of the branch/data selection field.

7 Claims, 13 Drawing Sheets

| ADDRESS | LABEL | BRANCH/D_SEL | E_N_ADD/CNT | OT GATE | CONTENT |
|---|---|---|---|---|---|
| 00 | START | 111 | STOP | NOP | INDEX PULSE WAITING |
| 01 | | 100 | 0B | WG | VFO FIELD WRITE |
| 02 | | 110 | 00 | WG | SYNC PATTERN WRITE/CRCINI GENERATION |
| 03 | | 011 | 06 | WG | HCYLH WRITE |
| | | | | | CYLL WRITE |
| | | | | | TSNO WRITE |
| | | | | | FCDRH WRITE |
| | | | | | CDRL WRITE |
| 04 | | 100 | 01 | WG | CRC WRITE |
| 05 | | 100 | 01 | WG | PAD WRITE |
| 06 | | 100 | 0B | WG | SPLICE |
| 07 | | 110 | 00 | WG | VFO FIELD WRITE |
| 08 | | 010 | VECT1 | WG | SYNC PATTERN WRITE |
| | | | | | DATA WRITE |
| | | | | | ECC WRITE |
| 09 | | 100 | 01 | WG | PAD WRITE |
| 0A | | 100 | START | NOP | JUMP TO "START"/TSNO INCREASE/DSTC DECREASE |
| 0B | | | | | |
| 0C | VECT1 | 100 | 01 | WG | PAD WRITE |
| 0D | | 111 | STOP | NOP | EOS WAITING |
| 0E | | 100 | 0B | WG | VFO FIELD WRITE |
| 0F | STOP= | 110 | 00 | WG | SYNC PATTERN WRITE/RETURN |

7BIT

Fig. 7

| ADDRESS | LABEL | BRANCH/D_SEL | E_N_ADD/CNT | OT GATE | CONTENT |
|---|---|---|---|---|---|
| 00 | START | 111 | STOP | NOP | SECTOR PULSE WAITING |
| 01 |  | 100 | 0B | RG | VFO FIELD WRITE |
| 02 |  | 110 | START | RG | SYNC PATTERN WAITING/CRCINI GENERATION |
| 03 |  | 011 | 06 | RG | HCYLH READ |
|  |  |  |  |  | CYLL READ |
|  |  |  |  |  | TSNO READ |
|  |  |  |  |  | FCDRH READ |
|  |  |  |  |  | CDRL READ |
|  |  |  |  |  | CRC READ |
| 04 |  | 001 | 00 | NOP | TO START ON CRC ERROR/ID ERROR/SKIP |
| 05 |  | 100 | 00 | RG | SPLICE |
| 06 |  | 100 | 06 | RG | VFO FIELD READ |
| 07 |  | 110 | STOP | RG | SYNC PATTERN WAITING |
| 08 |  | 010 | VECT1 | RG | DATA READ |
|  |  |  |  |  | ECC READ |
| 09 |  | 001 | STOP | NOP | TO STOP ON ECC ERROR |
| 0A |  | 000 | START | 1 NOP | JUMP TO START/TSNO INCREASE, DSTC DECREASE |
| 0B |  |  |  |  |  |
| 0C | VECT1 | 111 | STOP | NOP | EOS WAITING |
| 0D |  | 100 | 0B | RG | VFO FIELD READ |
| 0E |  | 110 | 00 | RG | SYNC PATTERN WAITING/RETURN |
| 0F | STOP= |  |  |  |  |

← 7BIT →

| ADDRESS | LABEL | BRANCH/D_SEL | E_N_ADD/CNT | OT | GATE | CONTENT |
|---|---|---|---|---|---|---|
| 00 | START | 111 | STOP | | NOP | SECTOR PULSE WAITING |
| 01 | | 100 | 06 | | RG | VFO FIELD READ |
| 02 | | 110 | START | | RG | SYNC PATTERN WAITING/CRCINI GENERATION |
| 03 | | 011 | 06 | | RG | HCYLH READ |
| | | | | | | CYLL READ |
| | | | | | | TSNO READ |
| | | | | | | FCDRH READ |
| | | | | | | CDRL READ |
| | | | | | | CRC READ |
| 04 | | 001 | 00 | | NOP | TO START ON CRC ERROR/ID ERROR/SKIP |
| 05 | | 100 | 00 | | WG | SPLICE |
| 06 | | 100 | 0B | | WG | VFO FIELD WRITE |
| 07 | | 110 | 00 | | WG | SYNC PATTERN WRITE |
| 08 | | 010 | VECT1 | | WG | DATA WRITE |
| | | | | | | ECC WRITE |
| 09 | | 100 | 01 | | WG | PAD WRITE |
| 0A | | 000 | START | 1 | NOP | JUMP TO START/TSNO INCREASE, DSTC DECREASE |
| 0B | | | | | | |
| 0C | VECT1 | 100 | 01 | | WG | PAD WRITE |
| 0D | | 111 | STOP | | NOP | EOS WAITING |
| 0E | | 100 | 0B | | WG | VFO FIELD WRITE |
| 0F | STOP= | 110 | 00 | | WG | SYNC PATTERN WRITE/RETURN |

5,946,706

PROGRAMMABLE CONTROL SEQUENCER OF DISK CONTROLLER AND METHOD FOR MAP ALLOCATION THEREFOR

1. FIELD OF THE INVENTION

The present invention relates to a disk controller for use in a magnetic disk drive data storage system and, more particularly, relates to a programmable control sequencer provided to the disk controller and a method for its map allocation.

2. DESCRIPTION OF THE RELATED ART

A typical disk controller for use in a magnetic disk drive data storage system such as a hard disk drive (HDD) and a floppy disk drive (FDD), is provided with a programmable control sequencer to make control of a predetermined set of operation sequences for disk formatting or data reading and writing. Further, the disk controller not only serves to provide an interfacing stage in between a host computer, a microcontroller unit within the disk drive data storage system and a disk recording medium divided into a servo region and a data region, but also performs error detection and correction during data Read/Write operations.

Recently, the capability for automatic execution in the disk controller itself has been even more greatly improved to allow its local microcontroller unit to have less processing load, thereby allocating more time resources to any other functions of the local microcontroller unit, for example, such as a servo control, in which disk controller a programmable control sequencer is preferred to use so as to permit better application to the various specifications of disks. The programmable control sequencer is provided with a program random access memory (RAM) for storing a microprogram therein and one or more peripheral circuits, and executes an automatic sequence control in accordance with either one of any instructed operations such as a power ON initialization or Read/Write/Format operation under control of the microprogram loaded into the program RAM, wherein the microprogram should be down loaded by the local microcontroller into the program RAM prior to every execution of such a Read/Write/Format operation or upon each power ON reset.

As aforementioned, as the microcontroller should effect a down load of the appropriate microprogram into the program RAM upon every power ON reset or prior to every execution of Read, Write or Format operation, the overall operating efficiency of a disk drive storage system will be significantly subject to a time duration consumed for such a down loading. Assuming that 1 clock period for a local microcontroller is a time "T", its triple amount of time "3T" is normally required to write a program into a corresponding RAM address. For example, the total time consumption for down loading of a microprogram according to two different sizes of program RAMs can be respectively shown by comparison, as follows:

(1) Using a CIRRUS disk controller with 31×4 byte program RAM (Model CL-SH5600), Total Time Consumption is 31×4×3T (=372T), and (2) Using an ADAPTEC disk controller with 48×4 byte program RAM (Model AIC-8265), Total Time consumption is 48×4×3T (=576T).

Therefore, from the above comparison, it will be appreciated that the work load of a local microcontroller unit required for down loading a given microprogram upon each operation request greatly depends upon the size of a program RAM, wherein for example the latter ADAPTEC model AIC-8265 disk controller requires more operating time by about 47% than the former CIRRUS model CL-SH5600.

In the meanwhile, the size of a program RAM can be determined by a sequencer map which concerns the topology of field allocation for a storage area in the program RAM, in which storage area corresponding to each address of the program RAM each instruction set constituting a microprogram is written, said each instruction set being changeable depending on the field topology. Accordingly, as the size of a program RAM in the programmable control sequencer is determined according to its method of field allocation, it will exert a great influence upon an overhead of the microcontroller, ultimately affecting the performance of the disk drive storage system itself.

Thus, necessity to reduce the size of a program RAM has been noted in the state of the art by trying better efficient allocation of the sequencer map. As one of the recent solutions to fulfill the above necessity, a Patent Application No. 72286/1995 filed on Dec. 30, 1995 in the Republic of Korea by the same applicant and assigned to the same assignor discloses a method for assignment of a sequencer map to enable to use a 32×2 byte size of program RAM, which is capable of considerable decrease of the time consumption for down loading of a microprogram, for example, to a time amount "192T" (that is, 32×2×3T), as compared to the prior art. However, it is still desirous in the art to achieve even less time consumption than the above application or any other prior art, if any.

SUMMARY OF THE INVENTION

It is therefore an object of the present invention to provide an improved programmable control sequencer and a method for its map allocation capable of reducing a size of program RAM in a disk controller of a magnetic disk drive storage system.

It is another object of the present invention to provide a programmable control sequencer and a method for its map allocation capable of decreasing a work load of a microcontroller in a magnetic disk drive storage system.

These and other objects can be achieved according to the principles of the present invention with a programmable control sequencer of a disk controller for use in a magnetic disk drive storage system, comprising:

a program random access memory (RAM) having a 16×7 bit size of storage area, said storage area in each address comprising a branch/data selection field, an encoded next address/count field and an output field;

an address generator for generating an address for accessing said program random access memory in accordance with the information of said branch/data selection field and said encoded next address/count field;

a decoder for decoding the encoded next address/count value to provide the decoded information to said address generator;

a branch/data selection decoder for decoding the information of said branch/data selection field, selecting a given data register to compare data read out from a disk with data of the selected data register, and pushing the data into a stack, said branch/data selection decoder generating a Read/Write signal to control operation of the disk and a sector updating signal;

a CDR counter for counting a value for CDR split by means of said branch/data selection decoder to thereby control said address generator;

a timer for starting an operation according to a branch condition of said branch/data selection field and limiting the maximum operating time for said branch/data selection decoder; and a sector updating circuit for executing a sector updating operation responsive to an output of said branch/data selection decoder.

According to another aspect of the present invention, there is disclosed a method for a programmable control sequencer having a program random access memory having a 16×7 bit size of data storage area in a disk controller for use in a magnetic disk drive storage system, comprising:

said program random access memory being provided with a sequencer map allocation comprising a branch/data selection field, an encoded next address/count field and an output field;

said branch/data selection field having either one of a branch condition or count field enable information and selecting a given data register to compare data read out from a disk with data of the selected data register;

said encoded next address/count field having an encoded value of either a next address or a count value according to said branch condition; and said output field being adaptable for testing a synchronization outside of said programmable control sequencer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 7 is a microprogram diagram for a FORMAT mode of the programmable control sequencer according to the sequencer map allocation of FIG. 5;

FIG. 9 is a microprogram diagram for a READ mode of the programmable control sequencer according to the sequencer map allocation of FIG. 5;

FIG. 11 is a microprogram diagram for a WRITE mode of the programmable control sequencer according to the sequencer map allocation of FIG. 5;

DETAILED DESCRIPTION OF THE PREFERRED EMBODIMENTS

Hereinafter, the preferred embodiment of the present invention will be described in further detail with reference to the accompanying drawings, in which the various particulars including flow charts for control, a number of bits or bytes, logic levels, data formats, a microprogram, etc. are illustrated only for better understanding of the present invention. However, it should be noted that the present invention shall not limited to those particulars set forth by way of an example only in the following embodiment. In addition, the programmable control sequencer of the present invention will be referred to as "sequencer" for the convenience of explanation.

Figure 1:
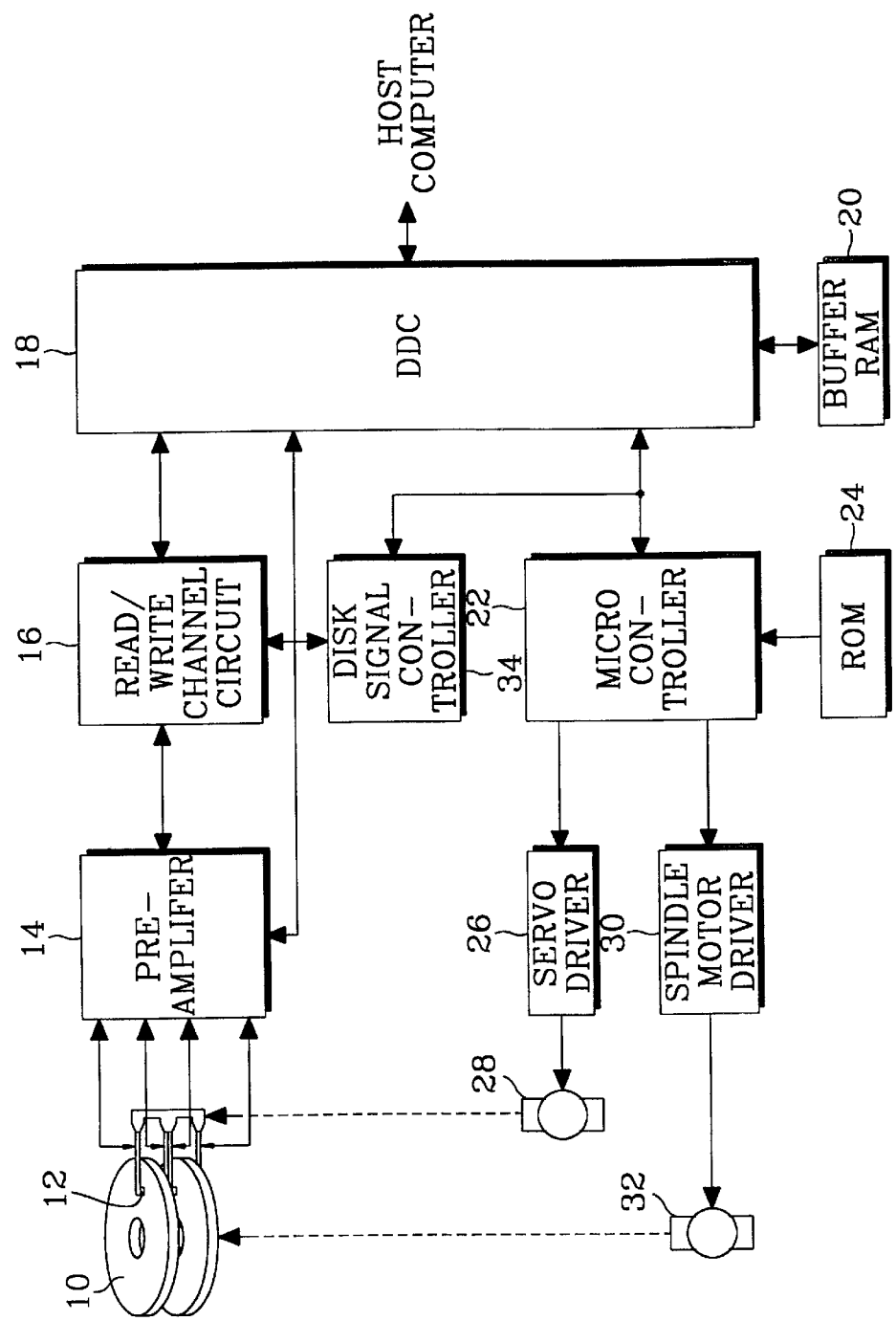
FIG. 1 is a schematic block diagram illustrating the construction of a conventional hard disk drive used in the present invention.

Turning now to the drawings, FIG. 1 is a block diagram illustrating the construction of a conventional hard disk drive (HDD) as a magnetic disk recording apparatus used in the present invention, wherein two data disks 10 and four read/write heads 12 installed with each disk surface are shown. Referring to the FIG. 1, a preamplifier 14 coupled to the heads 12 amplifies an analog read signal picked up by the heads 12 to apply the read signal to a read/write channel circuit 16, which circuit in turn, during a write operation, applies a write current according to any encoded write data to the heads 12 so as to record the write data onto the disks 10. The read/write channel circuit 16 detects a data pulse out of the read signal inputted from the preamplifier 14 and then decodes the data pulse to deliver the same pulse to a disk data controller 18 (hereinafter referred to as "DDC"), while the read/write channel circuit 16 serves to deliver the write data outputted from the DDC 18 to the preamplifier 14.

The DDC 18 is provided with a sequencer for performing a sequence of operations according to a microprogram down loaded from a microcontroller 22 and controls a read operation to get data out of the disk disks for transmission to a host computer and a write operation to record data from the host computer onto the disks through the read/write channel circuit 16 and the preamplifier 14. Further, the DDC 18 serves as an interface for data communication between the host computer and the microcontroller 22, in which data communication a buffer RAM 20 temporarily stores the data transmitted therebetween.

The microcontroller 22 controls the DDC 18 in response to a Format/Read/Write instruction from the host computer, and also controls a track searching or track following operation. A read only memory (ROM) 24 stores an execution program for the microcontroller 22 as well as various preset values. A servo driver 26 generates a driving current for actuating an actuator 28 responsive to a control signal for position control of the heads supplied 12 from the microcontroller 22. The actuator 28 serves to move the heads 12 on the disks 10 in response to direction and level of the driving current of the servo driver 26. A spindle motor driver 30 drives a spindle motor 32 to rotate the disks in accordance with a control value for rotation control of the disks provided from the microcontroller 22. A disk signal controller 34 makes decoding of servo information from read data outputted from the read/write channel circuit 16 to deliver the encoded data to the microcontroller 22, and generates various control signals for read/write operation under control of the DDC 18 and the microcontroller 22 to thereby provide these control signals to the preamplifier 14, the read/write channel circuit 16 and the DDC 18. The disk signal controller 34 may preferably be provided with an ASIC (Application Specific Integrated Circuit) component designed to be better adapted to each HDD apparatus.

Figure 2:
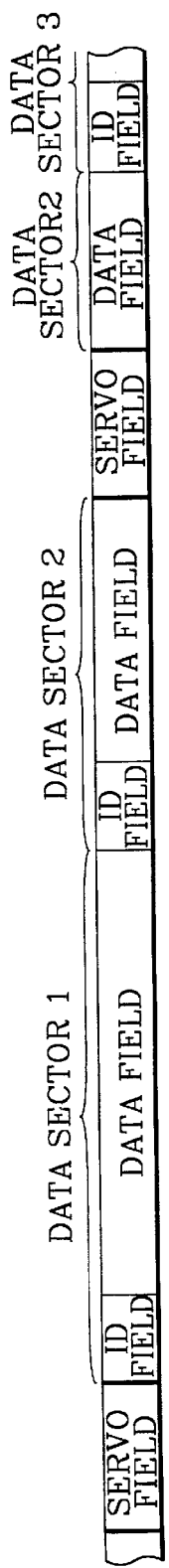
FIG. 2 is a diagram illustrating the construction of data format in a conventional constant-density recording type of magnetic disk applicable in the present invention.

Referring now to FIG. 2, there is shown a diagram indicative of the construction of data format in a conventional type of Constant-Density Recording (hereinafter, referred to as "CDR") disk applicable in the HDD according to the present invention, in which a sector format of a single track is illustrated, with a rough scale, by way of example, having two split data sectors provided with a complete data sector and another data sector adjacent to the complete data sector between servo fields. This CDR format is also known as a Zone-Bit Recording (ZBR) format in the art.

According to the known CDR format, an information recording region on a disk is generally divided into a multiplicity of zones having a constant recording density in a radial direction from the center of the disk, wherein a number of data sectors in tracks of each zone is assigned differently from each other, so that tracks in an outer circumferential zone have more data sectors than tracks in an inner circumferential zone. The data sector is intended to designate an unit area to make data access on a disk in the magnetic disk recording apparatus, and has an identical size irrespectively of any positions on the disk, for example, 512 bytes of size. In case that an embedded sector servo system, which is one of various known methods for providing a magnetic disk recording apparatus with the position information for heads, is adopted as servo control, one data sector may be divided into two segments according to each zone in the disk, in which servo system each track is divided into a servo information region and a data information region provided alternatively in a circumferential direction, wherein the servo information region is a servo field for recording servo information and the data information region is an area for recording actual data providing data sectors.

Referring again to FIG. 2, data sectors each are divided into an identification (ID) field and a data field, in which the ID field includes a header having the information for identification of a corresponding data sector and the data field following the ID field is used for recording digital information.

Figure 3:
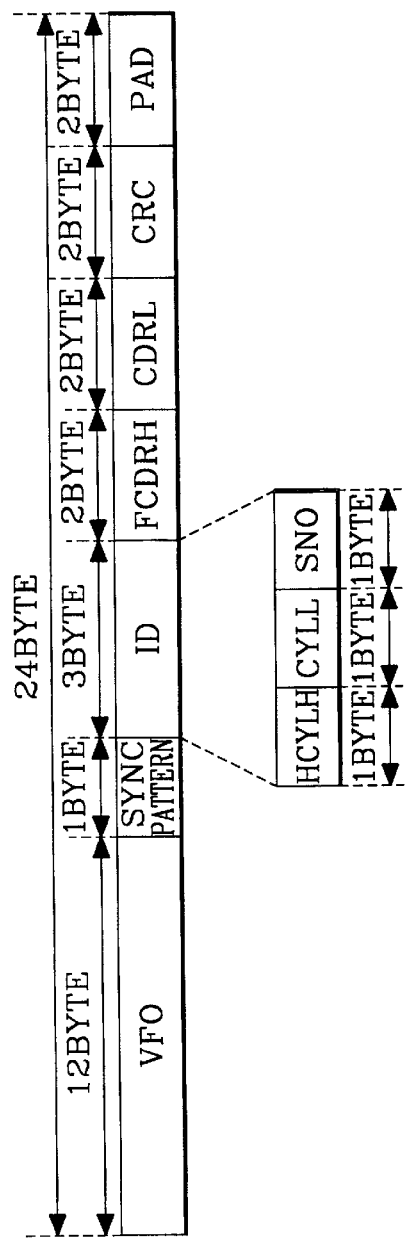
FIG. 3 is a diagram illustrating the detailed format of an ID field in FIG. 2.

FIG. 3 illustrates a further detailed format of an ID field, which includes a Variable Frequency Oscillator (VFO) region of 12 bytes as an identification preamble that is a synchronization signal used for clock synchronization during reading the ID field. A synchronization pattern of 1 byte follows the VFO region as an ID address mark and is also provided with a particular data pattern, for example, "A5" (in hexadecimal value) in order to once again identify the ID region having information regarding the position or characteristic of the respective data sector existing in a corresponding data information region, thereby informing a subsequent ID region consisting of a head number HCYLH, a cylinder number CYLL and a sector number SNO, all of these three numbers being of 1 byte respectively, wherein the HCYLH includes a head position information, the CYLL a cylinder position information for track identification, and the SNO a sector number of the data sector following the ID field. These head number, cylinder number and sector number will be a kind of physical identification information identifying a number of the data sector with the current head position. In case where a single head and a single sided disk are used in a magnetic disk recording apparatus, the head/cylinder number of the ID information may be omitted in the ID region. Next regions FCDRH and CDRL each are of 2 bytes, and include various information such as the position information indicative of a position of each data sector existing within a corresponding data information region, the information regarding the split of a following data sector, the usability information regarding the data sectors, and the split information regarding starting data sector in the corresponding data information region as split information for the Constant-Density Recording system. This split information allows data access to a split data sector. A next region CRC (Cyclic Redundancy Code) is also of 2 bytes and serves as an error detection code for error detection and correction checking from the ID region through the CDRL region of the ID field. The last region PAD is a postamble of the ID field to serve as a gap for a following data field.

Figure 4:
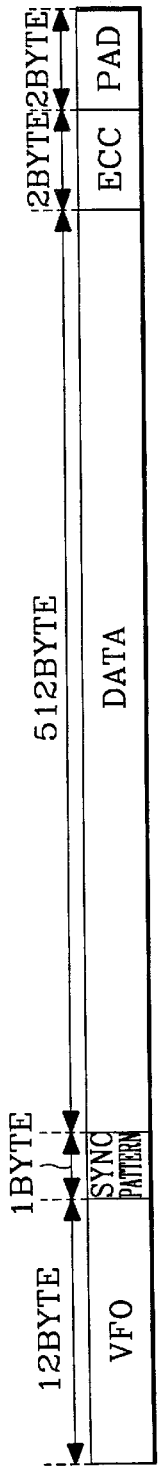
FIG. 4 is a diagram illustrating the detailed format of a data field in FIG. 2.

Referring now to FIG. 4, a diagram illustrating the detailed format of the data field, it comprises a VFO region of 12 byte data preamble, a synchronization pattern as a data address mark, an actual data stream of 512 bytes, an ECC region and a postamble data PAD. The data preamble is positioned between the ID postamble and the synchronization pattern data, to provide the clock synchronization in a reading operation for the data field as well as a field gap between the ID field and the data field. The synchronization pattern identifies a starting point of data stream to thereby provide a kind of synchronization necessary when reading the digital data stored in the magnetic disk recording apparatus. The ECC data is an error detection code for error detection and correction for the data address mark and the stored data. The postamble provides a timing margin required after the data reading operation.

Figure 5:
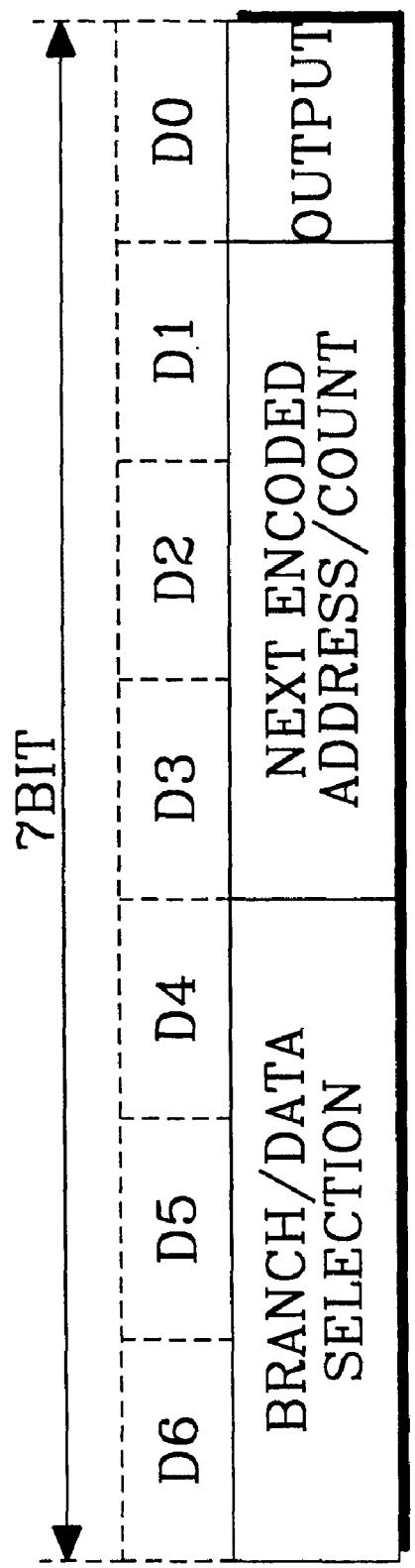
FIG. 5 is a diagram illustrating the allocation format of a sequencer map according to the present invention.

Referring now to FIG. 5, there is shown the allocation format of a sequencer map according to the present invention, applicable with the aforementioned field and data formats in the HDD of FIG. 1, wherein the format shows the allocation status of a storage region corresponding to each address with respect to a program RAM. Like allocation format is made to other storage regions corresponding to the remaining addresses. An instruction set consisting of 7 bits in total comprises a 3-bit branch/data selection field, a 3-bit encoded next address/count field, and an 1-bit output field.

The branch/data selection field consisting of the upper 3 bits D6–D4 of the total 7 bits is used for a branch condition or enabling a count field, and also for data selection to select a given data register to compare data of the selected register with NRZ data in the disk. Various functions defined by this 3-bit code combination of the branch/data selection field D6–D4 are described in further detail hereinafter.

In case that the branch/data selection field code is "000", the branching operation is made always, that is, jumping to a next address, at which time a program counter PC indicates the next address.

Then, in case that the branch/data selection field code is "001", it executes the branching on ID error/CRC error/ECC error/Skip/Defect, at which time if it is on ID error, CRC error, ECC error or Skip, then the program counter PC indicates the next address, while if it on the Disk Defect, then the program counter PC increases by "1".

When the branch field/data selection code is "010", it indicates a Data Count Enable in which if it is the end of data, then the selection is CRCECCEN, and if is the end of ECC, then the program counter PC increases by "1"; otherwise the data selection is BUFDEN.

Further, when the branch/data selection field code is "011", it indicates ID Count Enable, wherein if the ID count value is "00" (hereinafter, in hexadecimal value), then the data selection is HCYLH, if "01", it is CYLL, if "02", it is TSNO, if "03", it is FCDRH, if "04", it is CDRL, if "05" or "06", it is CRCECCEN, and if the Carry Out, then the program counter PC increases by "1".

Meanwhile, in case that the branch/data selection field code is "100", it designates a Count Enable, wherein if it is a Count Carry Out, then the program counter PC increases by "1". And in case that the branch/data selection field code is "101", it awaits the Count Enable, in which the count clock is divided 32 times for use as a clock, and if it is the Count Carry Out, then the program counter PC increases by "1".

Further, in case that the branch/data selection field code is "110", it awaits detection of synchronization or writes a synchronization pattern, in which in write mode, the program counter PC increases by "1" and the data selection is SYNCEN, while in read mode, if it is a Sync Timeout, then the program counter PC indicates the next address, and if it is the detection of synchronization, then the program counter PC increases by "1" and the data selection is SYNCEN.

In case that the branch/data selection field code is "111", it awaits an index pulse/sector pulse/End of Servo (EOS) signal, wherein in the index mode if it is the timeout in the second cycle, then the program counter PC indicates the next address. And, if the sector pulse is detected, then the program counter PC increases by "1". In the sector mode, if it is the timeout in the second cycle, then the program counter PC indicates the next address, and if the sector pulse is detected, then the program counter PC increases by "1". In CDR mode, if it is the timeout in the second cycle, then the program counter PC indicates the next address, and if the EOS is detected, then the program counter PC increases by "1".

In the meanwhile, the encoded next address/count field consisting of the lower 3 bits D3–D1 of the 7 bits set as forth in FIG. 5 is used as a next address or a count value according to the branch condition taken, wherein the branch conditions "000", "001", "110" and "111" are used as a next address field, and then the next address and the count value are stored into an internal register and selected by the encoded next address/count value.

The output field consisting of the lowermost 1 bit D0 of the 7 bits as set forth in FIG. 5 serves as an output test pin for testing the synchronization from the outside.

In addition, when the branch condition and the next address/count value are "000" and the output is "1", STINC makes an increase of Target Sector Number (TSNO) and a decrease of Disk Sector Transfer Count (DSTC), which are an updating function required to perform a multi-sector Read/Write operation irrespectively of the microcontroller 22. Now, referring to the control for a Read gate RG and a Write gate WG, a Reset RG/WG operation is made on "001", "101" and "111" of the branch conditions. When one sector of the microprogram is divided into the ID section and the data section with respect to the branch condition "011", the RG/WG control of for execution of Format/Read/Write operation is as follows. If a format flag that controls the sequencer is set, then the WG gets "ON", if the format flag is reset and RBW flag is "0", then the RG gets "ON", the format flag is reset and the RBW flag is "1", then the WG gets "ON".

Figure 6:
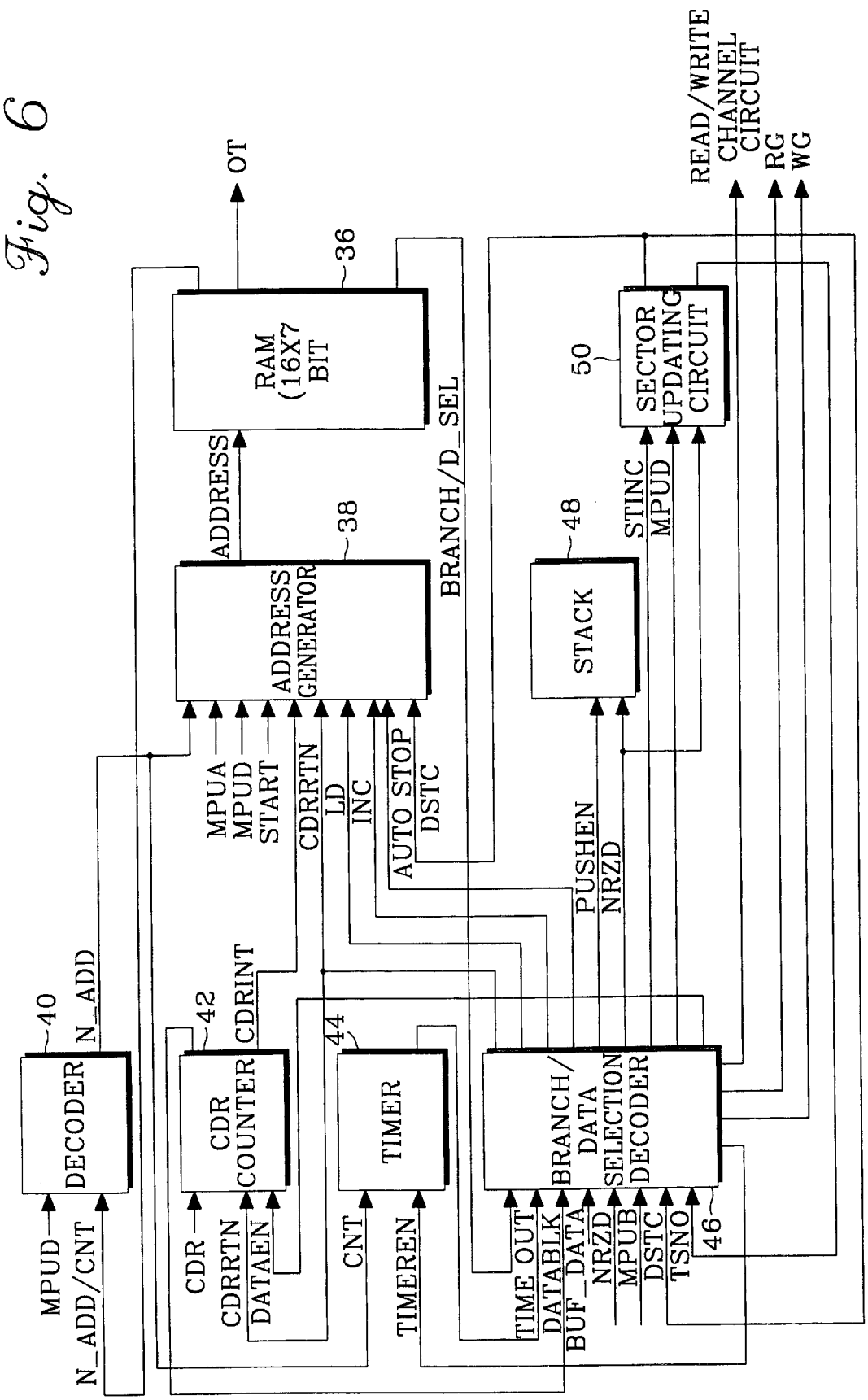
FIG. 6 is a block diagram of a programmable control sequencer according to the sequencer map allocation of FIG. 5 and the data format of FIG. 2 according to the present invention.

FIG. 6 illustrates a block diagram of a programmable control sequencer on basis of the sequencer map allocation set forth in FIG. 5 and the aforementioned data format of FIG. 2 in accordance with the present invention. A program RAM 36 of the sequencer provided to the DDC 18 according to the above sequencer map allocation is of 16×7 bit size. An address generator 38 generates a RAM address according to the program counter PC in consideration of the status of signals such as CDRINT, CDRRTN, LD, INC, etc. At this time, if DSTC is "0", an automatic stop occurs, and a next address is "F" (in hexadecimal), then the signal LD is generated to stop operation of the sequencer. Among these stop conditions, in a CDR subroutine, if the RAM address increases from "E" to "F", then the normal operation is made, while in case of jumping (also referred to as "LD") into "F" in other address, a stop condition is used. Decoder 40 decodes data MPUD of the microcontroller 22 and the next address/count value N_ADD/CNT to therefrom generate the next address N_ADD. A CDR counter 42 starts its operation by the branch condition "010", generates the signal CDRINT if the CDR value is same as a CNT result, and then it halts operation till generation of the signal CDRRTN. If the flag SPLIT2 is set, then it is first generated the signal CDRRTN and secondly the CDRINT after a lapse of a preset value. A branch/data selection decoder 46 generates signals LD and INC that act as a reference signal of a next address by checking the branch condition, the corresponding signal and a status of a timer 44, by which the operation starts responsive to the branch condition and the maximum operating time is made. The branch/data selection decoder 46 compares data read out from the disk with a value of the data register selected, and makes a signal PUSHEN to store into a stack 48 the information such as HCYLH, CYLL, TSNO, FCDRH of the read data. The branch/data selection decoder 46 generates the Read/Write signal to control disk operation or a sector updating signal, by which signal a sector updating circuit 50 can carry out the updating operation irrespectively of the microcontroller 22.

Now, taking into account the microprogram formed of the sequencer map allocation as set forth in FIG. 5, further detailed description regarding the operation of the programmable control sequencer with the HDD construction of FIG. 1 will be made with reference to the aforementioned sequencer map and the following flow charts, in which for convenience' sake the description will be divided into Format Mode, Read Mode and Write Mode that are major operating modes in the HDD.

Format Mode

Referring to FIG. 7, there is shown a microprogram diagram for a Format Mode of the programmable control sequencer according to the sequencer map allocation of FIG. 5, wherein a first column "ADDRESS" indicates the RAM address, the second "BRANCH_D SEL" indicates the branch/data selection field of FIG. 5, the third "E_N_ADD/CNT" indicates the encoded next address/count field, and the fourth "OT" indicates the output field.

Figure 8A:
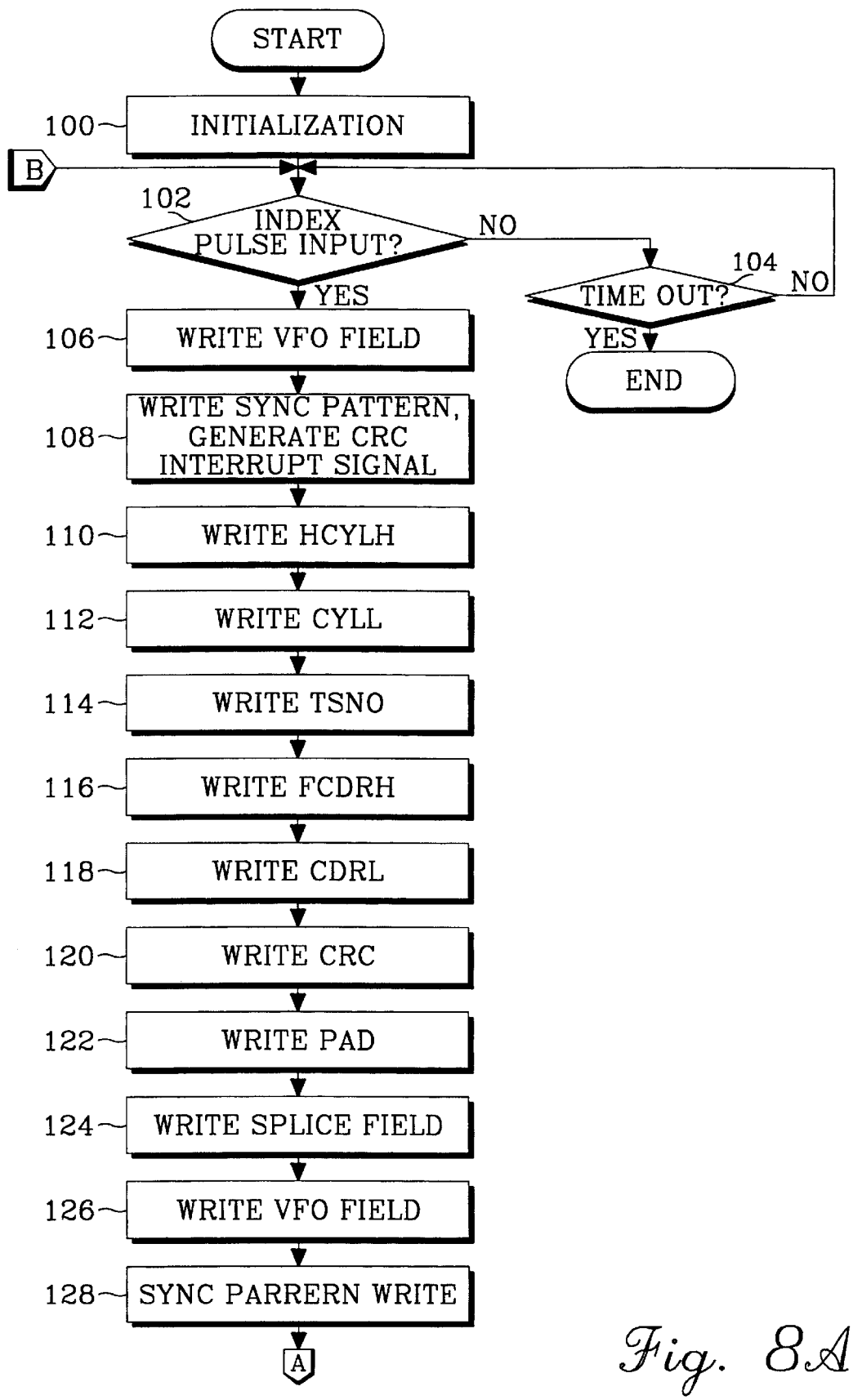
FIGS. 8A and 8B are flow charts illustrating the control steps of the programmable, control sequencer in the FORMAT mode of FIG. 7.
Figure 8B:
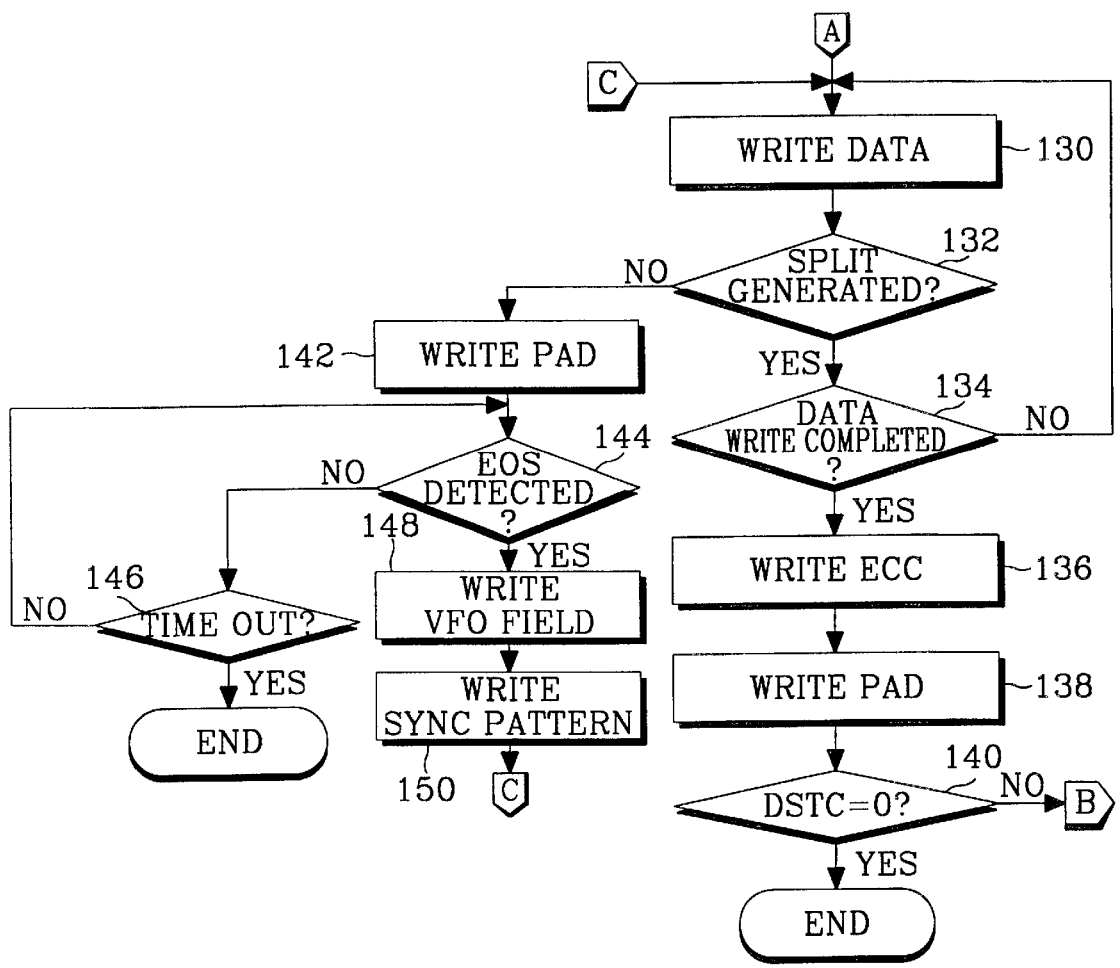

Referring to FIGS. 8A and 8B taken together, there is shown the flow chart of the processing control steps for the programmable control sequencer in the FORMAT mode of FIG. 7. The operation of the flow chart will be controlled by the sequencer set forth in FIG. 6.

At first, in step 100 of FIG. 8A the initialization is performed as follows. The maximum index searching time is set in timer 44, and then, the value "TSNO" to start a disk operation as well as the value "DSTC" designating a number of times of the disk operation is written. Further, the microcontroller 22 writes a microprogram as shown in FIG. 7. The address generator 38 receives address "MPUA" and data "MPUD" to write the same into RAM 36. Once the microcontroller 24 writes the starting address for RAM, the address generator 38 generates addresses and enables the sequencer to start the operation.

The timer 44 is then enabled in steps 102 to 104 corresponding to the address "00" (hereinafter, in hexadecimal) of FIG. 7, and the index pulse is awaited. At this time, if the index pulse is inputted, then it proceeds to the address stage "01" by the signal INC or if the index pulse is not inputted, then it keeps the current address stage "00". If the index pulse is not inputted till the timeout, that is, a value "1" is outputted, then it generates an Automatic Stop signal by a combination of the next address "OF" and the signal "LD", and the address generator 38 stops generation of addresses so as to stop the operation of the sequencer.

In step 106 corresponding to the address stage "01", a timer enable signal TIMEREN is delivered from the branch/data selection decoder 46 to the timer 44, by which a counter in the timer 44 continues to output value "00" till it reaches a next address/count field value. Thus, after writing 12 bytes of the value "00" into the VFO field of the ID field as shown in FIG. 3, it proceeds to a next address stage "02" by the INC. In step 108 corresponding to the address stage "02", one byte of the sync pattern is written on the disk 10 and the CRC interrupt signal CRCINI is generated for setting an area for CRC checking of the ID section.

In steps 110–120 corresponding to the address stage "03", two bytes data of HCYLH, CYLL, TSNO, FCDRH, CDRL and CRC are written on the disk 10 in sequence, and in step 122 corresponding to the address stage "04", two bytes of "00" are written on the disk as PAD. Further, in step 124 corresponding to the address stage "05", two bytes of "00" are written on the disk to carry out a splice between the ID field and the data field.

In step 126 corresponding to the address stage "06", 12 bytes of the value "00" are written into the VFO field of the data field as shown in FIG. 4 and in step 128 corresponding to the address stage "07", the synchronization pattern is written on the disk. And in steps 130–136 corresponding to the address stage "08" the CDR counter 42 generates the signal DATAEN indicating that the data region begins at a next stage. Further, if any split should not occur in the data area, then data are continuously written on the disk 10 until the count value of the CDR counter 42 reaches 512 and thereafter, it proceeds to an address "09". If the split is generated in the data region, then the CDR counter 42 maintains the current count value, generates the signal CDRINT and selects the next address stage to proceed to the address "0C" in the microprogram in FIG. 7. At this stage, the CDR counter 42 counts and compares a number of data bytes with the CDR value, and if the both are same, then it generates the CDRINT. The address generator 38 stores the current stage upon generation of the CDRINT and generates the next address "N_ADD". The CDR counter 42 keeps the current value during processing of the CDRINT, and after processing of the CDRINT again starts to count the number of data, thereby processing a total of 512 bytes of data before proceeding to the next stage. Describing further the CDR procedure performing a servo skipping during Format Mode, the CDR interrupt is generated to store the current WCS_ADD and count value, and the control jumps to an address "0C" of FIG. 7, namely, to VECT1. Then, the control is returned to the main routine and the current WCS_ADD and count value is stored.

Next, in step 136, 11 bytes of ECC data are written on the disk, and in step 138 corresponding to the address stage "09", two byte data of the value "00" as PAD are written on the disk.

In step 140 corresponding to the address stage "0A", a comparison with the current DSTC value is made, in which comparison if the result is "0", then it means completion of the format operation for intended sectors, and thus, the sequencer controls to stop generation of addresses in the address generator 38 and to end all the execution. However, if the DSTC value is not "0", then the sector updating circuit 50 performs the TSNO increase and the DSTC decrease and it proceeds to the address stage "00". In address stage "0B", the address generator 38 stops generation of the addresses and the sequencer stops the operation.

In step 142 corresponding to the address stage "0C", it is the case that a split occurs in the data region, so two byte of the value "00" are written on the disk as PAD, and then it proceeds to a next address "0D". Further, in steps 144–146 corresponding to the address stage "0D", the timer 44 is enabled and the current status is kept till detection of the EOS. Here, if the EOS is detected, then it proceeds to a next address "0E", while if it is the timeout, then the operation is controlled to end by an automatic stopping.

In step 148 corresponding to the address stage "0E", 12 bytes of the value "00" are written on the disk as shown in FIG. 4, and in step 150 corresponding to the address stage "0F", the sync pattern is written and the control proceeds to the address stage "0B", which is the original position that the CDRINT has been generated in the address generator 38 by the CDRRTN having a priority that is not the branch condition. Therefore, it will be appreciated that the disk Format operation is carried out as aforementioned.

The stack 48 stores the information HCYLH, CYLL, TSNO and FCDRH by the signal PUSHEN in a case that the most significant bit of the data selection field is "1", namely, in the address stage "03".

Read Mode

Referring to FIG. 9, there is shown a microprogram diagram for a Read Mode of the programmable control sequencer according to the sequencer map allocation of FIG. 5, wherein a column "ADDRESS" indicates the RAM address for RAM 36, "BRANCH/D_SEL" the branch/data selection field of FIG. 5, "E_N_ADD/CNT" the encoded next address/count field, and "OT" the output field.

Figure 10A:
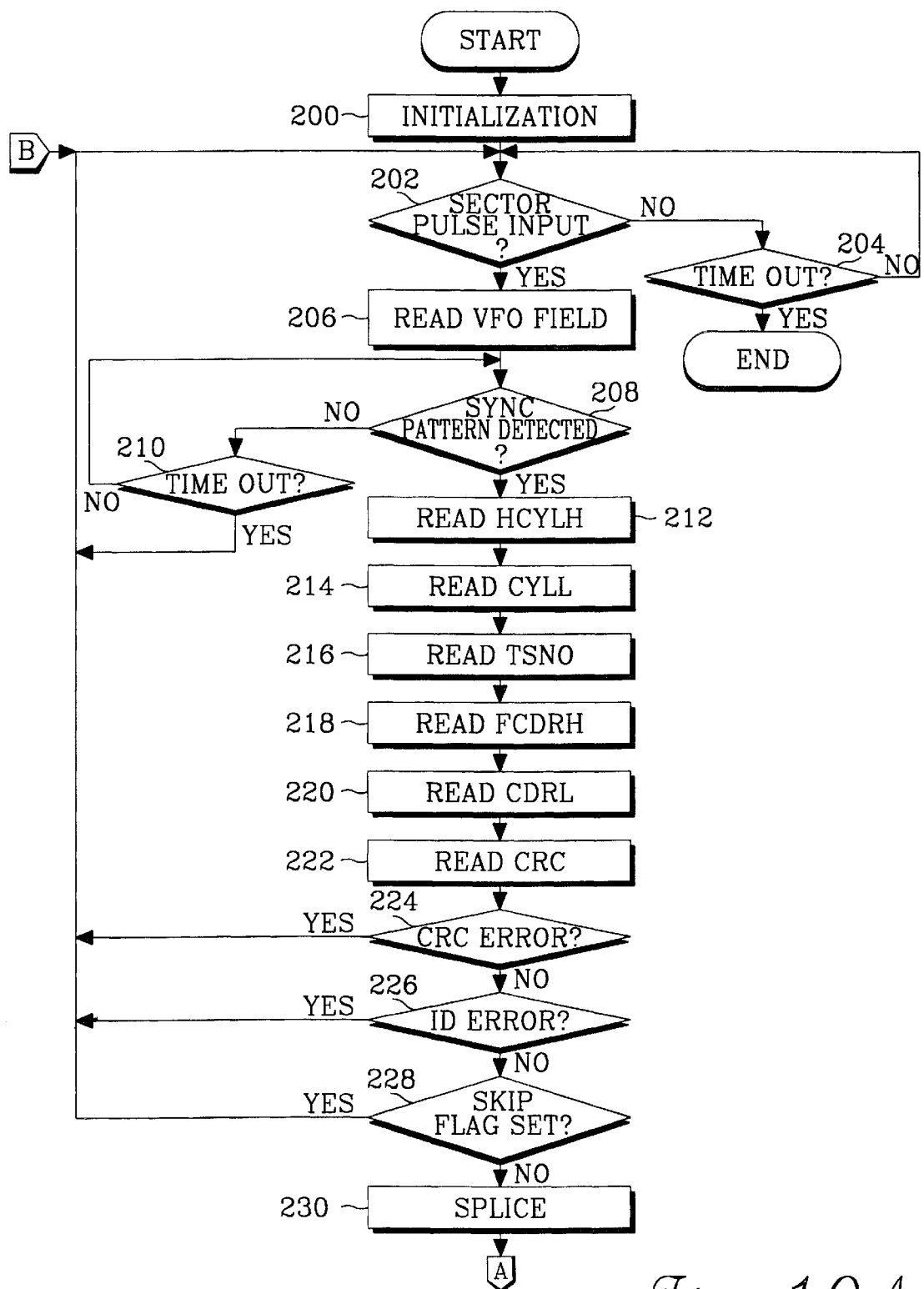
FIGS. 10A and 10B are flow charts illustrating the control steps of the programmable control sequencer in the READ mode of FIG. 9.
Figure 10B:
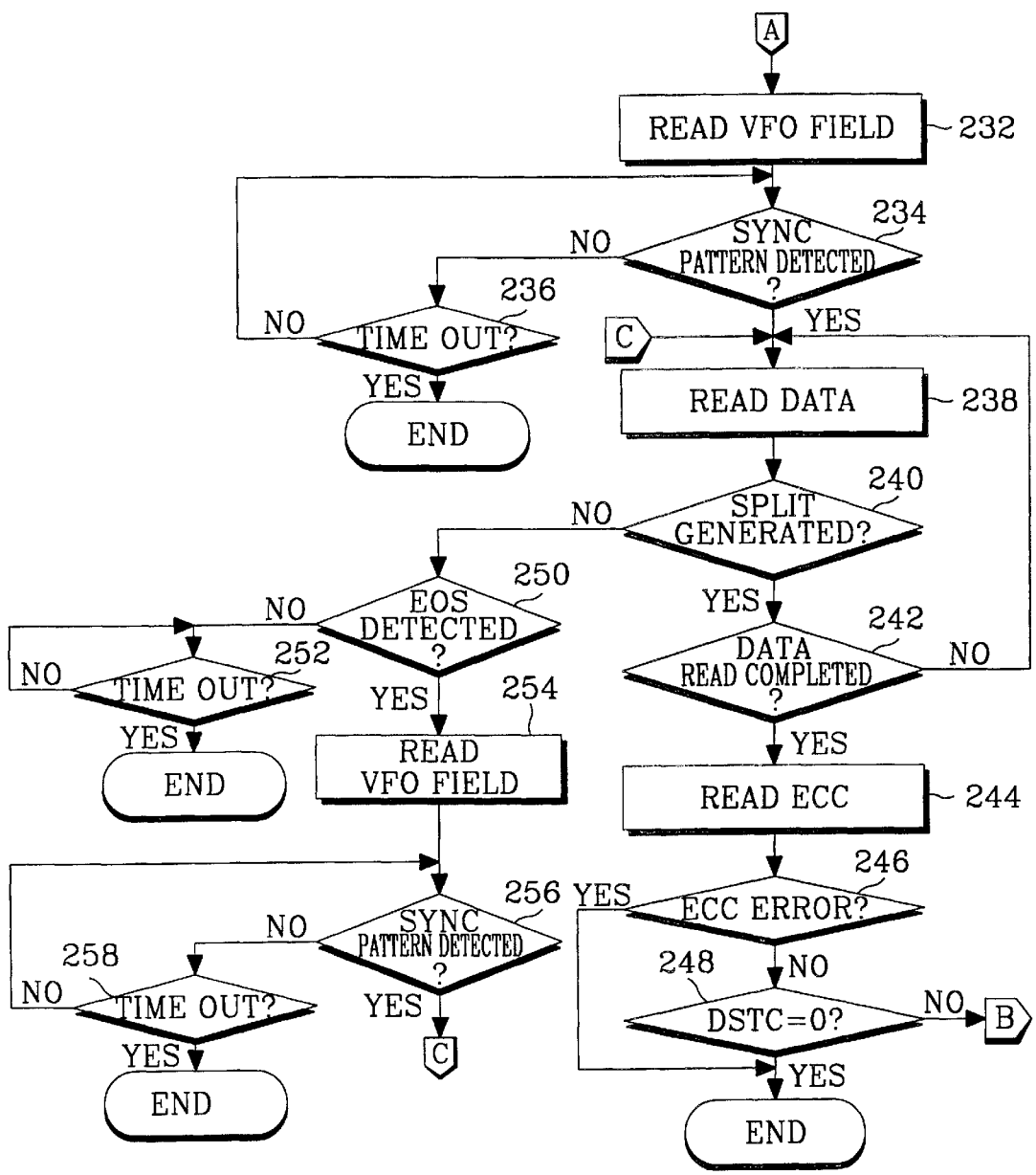

Referring to FIGS. 10A and 10B taken together, there is shown the flow chart defining the control steps for the programmable control sequencer in the Read mode of FIG. 9. The execution of the flow chart is controlled by the sequencer shown in FIG. 6.

First of all, in step 200 of FIG. 10A, the initialization procedure is performed as follows. The maximum time of index searching is set in the timer 44, and then, the values TSNO, HCYLH and CYLL to start the disk operation as well as the value "DSTC" designating a number of times of the disk operation and the maximum time till reading the sync pattern are written into the disk. The microcontroller 22 writes a microprogram prior to the disk operation, as shown in FIG. 9. The address generator 38 receives address "MPUA" and data "MPUD" to write the same into RAM 36. Once the microcontroller 22 writes the starting address for RAM, the address generator 38 begins to generate addresses and enables the sequencer to start the operation.

Subsequent to the initialization, the timer 44 is then enabled in steps 202 to 204 corresponding to the address "00" of FIG. 9, and the sector pulse is awaited. At this stage, if the sector pulse is inputted, then it proceeds to the address stage "01" by the signal INC, or if the sector pulse is not inputted, then it keeps the current address stage "00". Here, if the sector pulse should not be inputted till the timeout, that is, when a value "1" is outputted, then it generates an automatic stop signal by a combination of a next address "0F" and the signal LD, so that the address generator 38 stops generation of addresses, thereby ending the operation of sequencer.

In step 206 corresponding to the address stage "01", a timer enable signal TIMEREN is delivered from the branch/data selection decoder 46 to the timer 44, in which a counter within the timer 44 continues to read the value "00" till it reaches a next address/count field value. Thus, after reading 7 bytes of the value "00" from the VFO field of the ID field in the disk 10 as shown in FIG. 3, it proceeds to a next address stage "02" by the INC. In steps 208 to 210 corresponding to the address stage "02", a sync counter within the timer 44 is enabled and it is awaited till detection of the sync pattern. At this moment, if the timeout occurs, it proceeds to the address stage "00", while if the sync pattern is detected, then it proceeds to the address stage "03". Further, the CRC interrupt signal CRCINT is generated to set an area for CRC checking of the ID section.

In step 212–222 corresponding to the address stage "03", the data HCYLH, CYLL, TSNO, FCDRH, CDRL and CRC of FIG. 3 are read out from the disk 10 in sequence. In steps 224–228 corresponding to the address stage "04", existence of a CRC error, an ID error or any set skip flag from the data read out from the disk 10 is checked, in which if there is found no error in the CRC and ID, then it means that a target to read from the disk has been located, thereafter proceeding to checking on the skip flag set in the next step. However, if there is found any error, then it proceeds to the above address "00" in order to compare with the next sector. If the defect flag that is the upper bits of the FCDRH is 'set', then it generates the automatic stop, and if the skip flag is 'set', then it proceeds to the address stage "00"; otherwise it proceeds to the address stage "05". In step 230 corresponding to the address stage "05", the splice operation is performed by executing an 1 byte of non-operation. In step 232 corresponding to the address stage "06", the timer enable signal TIMEREN is delivered from the branch/data selection decoder 46 to the timer 44, in which a counter in the timer 44 continues to read the VFO field of FIG. 4, namely, the value "00" till it reaches the next address/count field value. Thus, after reading 7 bytes of the value "00" from the VFO field it proceeds to the address stage "07" by the INC. Then, in steps 234 to 236 corresponding to the address stage "07", the sync counter in the timer 44 is enabled and it awaits till detection of the sync pattern, at which time if the timeout occurs, then it stops the operation, and if the sync pattern is detected, then it proceeds to the address stage "08". Further, the signal ECCINI is generated to allocate an area for ECC checking of the data section and then, the CDR counter 42 generates the signal DATAEN indicating that the data region begins at the next stage.

Next, in steps 238 to 244 corresponding to the address stage "08", if the split should not occur in the data region, then data as seen in FIG. 4 is continuously read out of the disk until the count value of the CDR counter 40 reaches a number "512". If a split is generated in the data region, then the CDR counter 42 maintains the current count value and generates the signal CDRINT. The CDR counter 42 counts and compares a number of data bytes with the CDR value, and if the both are same, then it generates the CDRINT. The address generator 38 stores the current stage value upon generation of the CDRINT and generates the next stage address "N_ADD". Here, the CDR counter 42 keeps the current value during the processing of the CDRINT, and after processing the CDRINT it again start to count the number of data, thereby processing a total of 512 bytes of data before proceeding to the next stage. Then, 12 bytes of ECC data are read out of the disk 10. Describing further the CDR procedure in Read Mode, the CDR interrupt is generated to store the current WCS_ADD and count value, and then the control jumps to an address stage "0C" of FIG. 9, namely, to VECT1. Accordingly, the control returns to the main routine and the current WCS_ADD and count value are again stored. Next, in step 246 corresponding to the address stage "09", if the ECC data read out from the disk is different from the internally generated ECC data, then it stop the operation of sequencer to perform the error correction operation. However, if there is no error, then it advances to the next address stage "0A".

In the meanwhile, in step 248 corresponding to the address stage "0A", the comparison with the current DSTC value is made, in which if the result of comparison is "0", then it means completion of the read operation for intended sectors, and therefore, the sequencer controls to stop generation of addresses in the address generator 38 and ends the execution. However, if the DSTC value is not "0", then the sector updating circuit 50 performs the TSNO increase as well as the DSTC decrease and it proceeds to the address stage "00" in order to process another sector. Further, in step 250 corresponding to the address stage "0C", the timer 44 is enabled and the current status is kept till detection of the EOS. Here, if the EOS is detected, then it proceeds to a next address "0D", while if it is timeout, then the operation ends by an automatic stopping. In step 254 corresponding to the address stage "0D", 7 bytes of the value "00" of the VFO field are read from the disk 10. In steps 256 to 258 corresponding to the address stage "0E", the sync counter of the timer 44 is enabled and it is awaited till reading of the sync pattern. At this moment, if the timeout occurs, then the operation is stopped, and if the sync pattern is detected, then the control proceeds to the address stage "08" which is the original position that the CDRINT was generated in the address generator 38 by the CDRRTN having a priority than the branch condition. Therefore, it will be appreciated that the disk read operation from the disk is carried out as aforementioned.

The stack 48 stores the information HCYLH, CYLL, TSNO and FCDRH by the signal PUSHEN in case that the most significant bit of the data selection field is "1", namely, in the address stages "03".

Write Mode

Figure 12A:
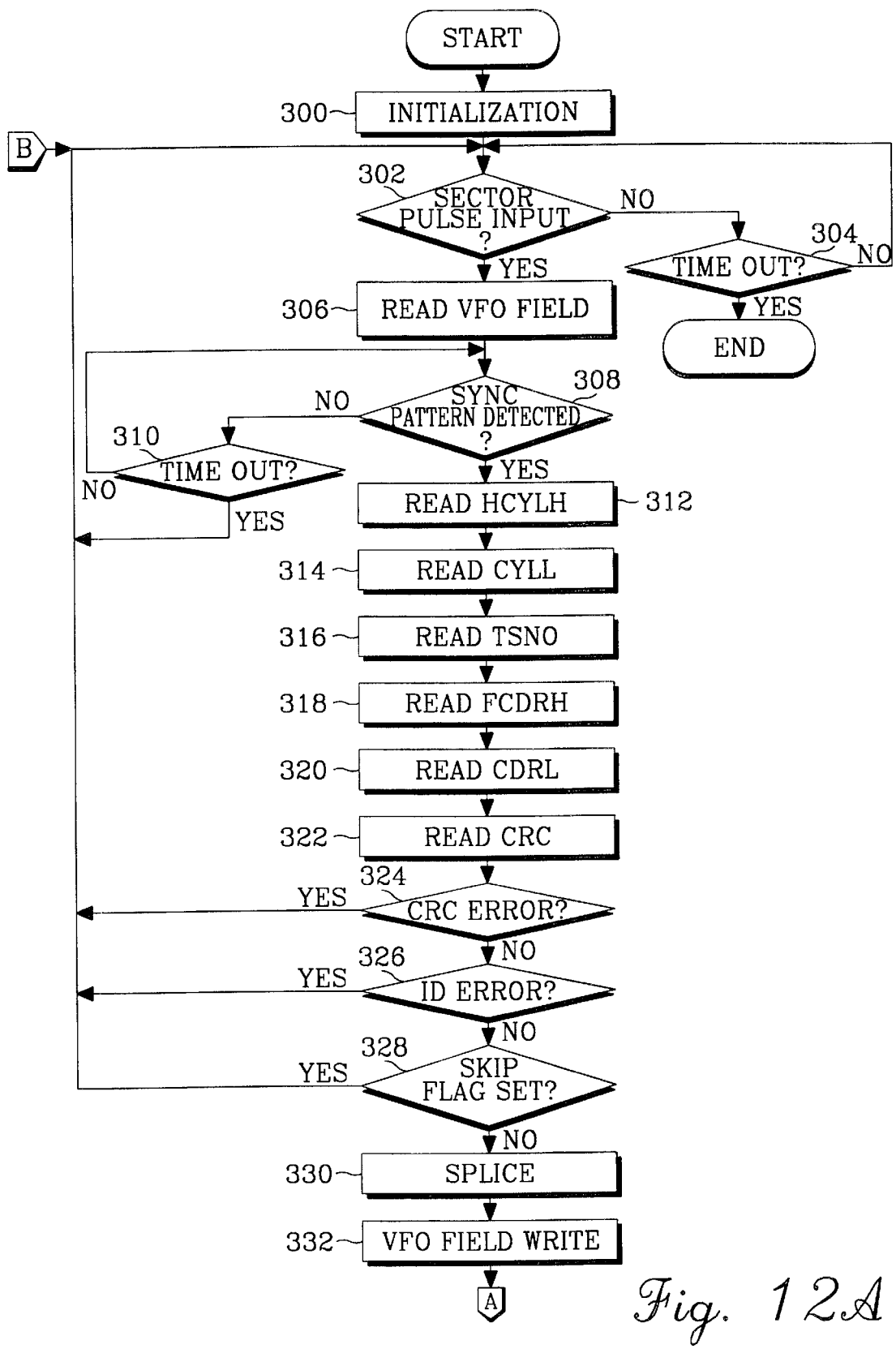
FIGS. 12A and 12B are flow charts illustrating the control steps for the programmable control sequencer in the WRITE mode of FIG. 11.
Figure 12B:
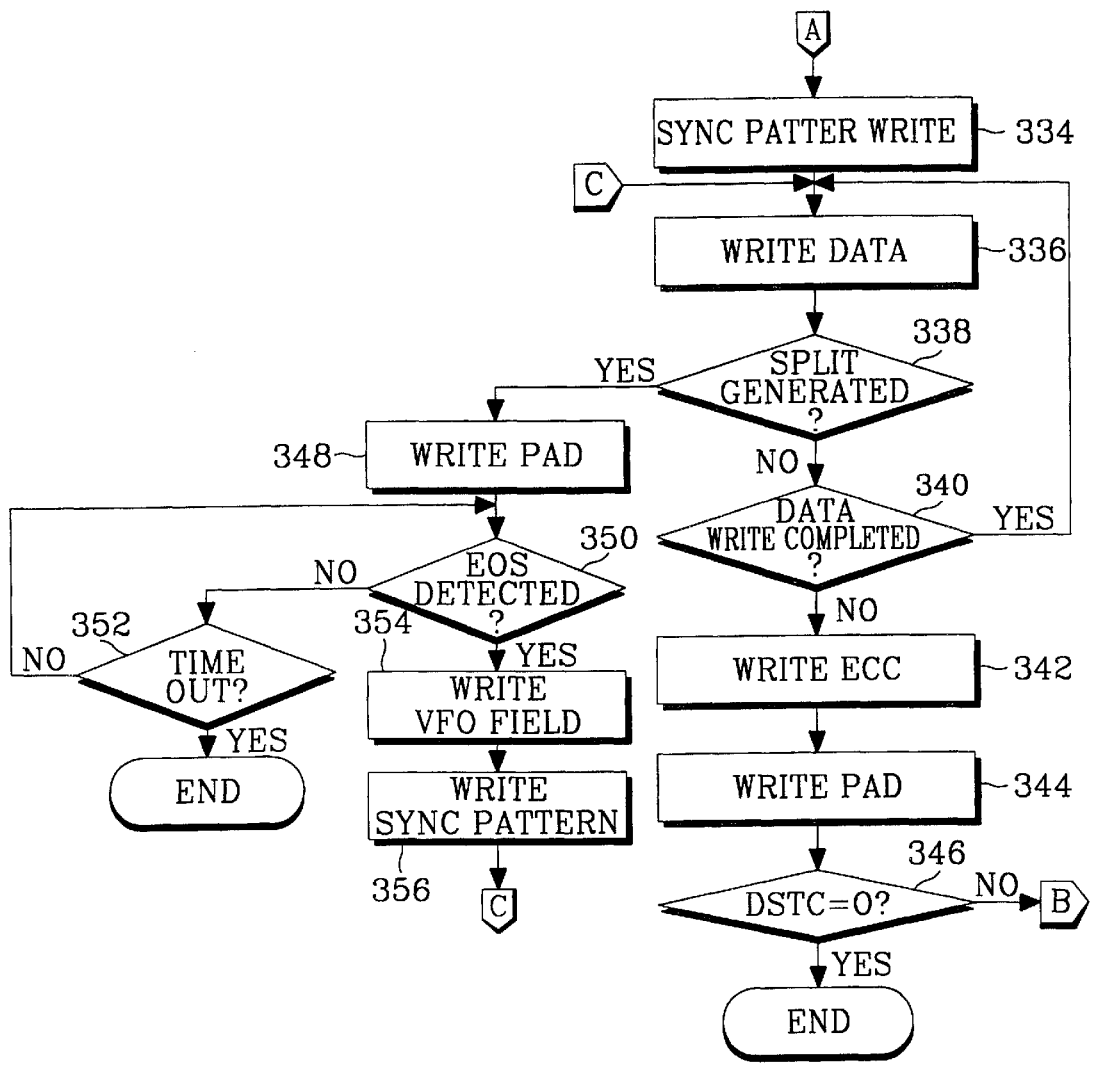

Referring now to FIG. 11, there is shown a microprogram diagram for the Write Mode of the programmable control sequencer according to the sequencer map allocation of FIG. 5, wherein a column "ADDRESS" indicates the RAM address for RAM 36, "BRANCH/D_SEL" the branch/data selection field of FIG. 5, "E_N_ADD/CNT" the encoded next address/count field, and "OT" the output field. Referring further to FIGS. 12A and 12B taken together, there is shown the flow chart defining the control steps for the programmable control sequencer in the Write mode of FIG. 11. Likewise, the execution of the flow chart is controlled by the sequencer shown in FIG. 6. First of all, the initialization procedure in step 300 and the operations in the successive steps from step 302 to step 330 corresponding to the address stages "00" to "05" in sequence are substantially identical or similar to those in the aforementioned steps 200 to 230 described heretofore during the Read Mode, which description may be incorporated hereinafter for convenience' sake.

Therefore, in step 332 corresponding to an address stage "06", the timer enable signal TIMEREN is delivered from the branch/data selection decoder 46 to the timer 44. Here, a counter in the timer 46 continues to read the value "00" till it reaches the next address/count field value. Thus, after writing 12 bytes of the value "00" into the VFO field of the ID field of FIG. 3 it proceeds to the address stage "07" by the INC. Then, in step 334 corresponding to the address stage "07", the sync pattern is written on the disk. Further, the signal ECCINI is generated to assign an area for ECC checking of the data section and the CDR counter 42 generates the signal DATAEN indicating that the data region begins at the next stage.

In steps 336 to 342 corresponding to the address stage "08", if the split should not occur in the data region, then the data as shown in FIG. 4 is written into the disk until the count value of the CDR counter 42 reaches a number "512". If a split should occur in the data region, then the CDR counter 42 maintains the current count value and generates the signal CDRINT. The CDR counter 42 counts and compares a number of data bytes with the CDR value, by which if the both are same, then it generates the CDRINT. The address generator 38 stores the current stage value upon generation of the CDRINT and generates the next stage address "N_ADD". Thus, the CDR counter 42 keeps the current value during the processing time of the CDRINT, and after processing the CDRINT it again starts to count the number of data, thereby processing a total of 512 bytes of data before proceeding to the next stage. Referring further to the CDR procedure during the Write Mode, the CDR interrupt is generated to store the current WCS_ADD and count value, and then the control jumps to the address stage "0C" of FIG. 11, namely, to VECT1. Accordingly, the control returns to the main routine and the current WCS_ADD and count value are again stored. In the following step, 2 bytes of ECC data as shown in FIG. 4 are created to be written into the disk.

In step 344 corresponding to the address stage "09", 2 bytes of the value "00" are written as the PAD into the disk. And, in step 346 corresponding to the address stage "0A", a comparison with the current DSTC value is made, by which if the result of comparison is "0", then it means completion of the write operation for intended sectors, and therefore, the sequencer controls to stop generation of addresses in the address generator 38 and ends the execution. However, if the DSTC value is not "0", then the sector updating circuit 50 performs the TSNO increase as well as the DSTC decrease and it proceeds to the address stage "00" in order to process another sector. Further, in step 348 corresponding to the address stage "0B", 2 bytes of the value "00" are written as the PAD into the disk. In steps 350 to 352 corresponding to the address stage "0C", the timer 44 is enabled and the current status is kept till detection of the EOS. Here, if the EOS is detected, then it proceeds to the address "0D", while if it is a timeout, then the operation in ended by an automatic stopping. In step 354 corresponding to the address stage "0D", 12 bytes of the value "00" of the VFO field are written into the disk. In step 356 corresponding to the address stage "0E", the sync pattern is written into the disk and then, the control proceeds to the address stage "08" which is the original position that the CDRINT was generated in the address generator 38 by the CDRRTN having the priority than the branch condition. Therefore, it will be appreciated that the disk Write operation onto the disk is carried out as aforementioned.

As a result, the stack 48 stores the information HCYLH, CYLL, TSNO and FCDRH by the signal PUSHEN in case that the most significant bit of the data selection field is "1", namely, in the address stages "03".

Accordingly, as apparent from the foregoing, notwithstanding using of the program RAM of 16×7 bit size for the programmable control sequencer according to the sequencer map allocation as set forth in the present invention, an effective Format/Read/Write operation could be accomplished. As a result of such a size reduction of RAM by at least about 50% as compared to the prior ones, it will be appreciated that the hardware construction of a programmable control sequencer could be more effectively simplified. Moreover, as a shorter time is required for a microcontroller 22 to down load the program (for example, 16×1×3T=48T in the foregoing embodiment), the overhead of the microcontroller may decrease in a greater degree as compared to the aforesaid known microcontroller. For example, a size of the program RAM according to the present invention can be reduced up to 7.3% of AIC-8265 model, 11.3% of CL-SH5600 model, or 21.9% of the size of the foregoing Korean application No. 72286/1995, which in turn achieving about 75% decrease of the overhead. As a result, this will lead to less loading to a programmable control sequencer of a disk controller for the magnetic disk drive recording apparatus.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A programmable control sequencer of a disk controller for use in a magnetic disk drive storage system, comprising:

a program random access memory (RAM) having a 16×7 bit size of storage area, said storage area in each address comprising a branch/data selection field, an encoded next address/count field and an output field;

an address generator for generating an address for accessing said program random access memory in accordance with information of said branch/data selection field and said encoded next address/count field;

a decoder for decoding an encoded next address/count value to provide decoded information to said address generator;

a branch/data selection decoder for decoding information of said branch/data selection field, selecting a data register to compare data read out from a disk with data of the selected data register, and pushing data into a stack, said branch/data selection decoder generating a Read/Write signal to control operation of the disk and a sector updating signal;

a Constant-Density Recording (CDR) counter for counting a value for CDR split by means of said branch/data selection decoder to thereby control said address generator;

a timer for starting an operation according to a branch condition of said branch/data selection field and limiting the maximum operating time for said branch/data selection decoder; and a sector updating circuit for executing a sector updating operation responsive to an output of said branch/data selection decoder.

2. A map allocation method for a programmable control sequencer comprising the steps of:

providing a program random access memory having a 16×7 bit size of data storage area in a disk controller for use in a magnetic disk drive storage system; and providing a sequencer map allocation for said program random access memory, said sequencer map allocation comprising a branch/data selection field, an encoded next address/count field and an output field;

said branch/data selection field having one of a branch condition and count field enable information and selecting a data register to compare data read out from a disk with data of the selected data register;

said encoded next address/count field having an encoded value of one of a next address and a count value according to said branch condition; and said output field for testing a synchronization outside of said programmable control sequencer.

3. The map allocation method as set forth in claim 2, wherein said branch/data selection field represents in accordance with a 3-bit code combination one of the following conditions:

branching all the time, branching on Identification Field (ID) error/Cyclic Redundancy Code (CRC) error/Error Detection Code (ECC) error/Skip, Data Count Enable, ID Count Enable, Count Enable, Count Enable Waiting, Waiting synchronization detection, Writing synchronization pattern, and Waiting Index Pulse/Sector Pulse/End of Servo signal.

4. The map allocation method as set forth in claim 2, wherein said encoded next address/count field has a 3-bit value usable as one of the next address and the count value according to a code of said branch/data selection field.

5. The map allocation method as set forth in claim 4, wherein said output field has a 1 bit code value.

6. The map allocation method as set forth in claim 5, wherein said branch/data selection field and said encoded next address/count field are "000" and a combination of the output field "1" is used as an updating timing point in order to perform a sector updating operation irrespective of a microcontroller of said disk controller.

7. The map allocation method as set forth in claim 6, wherein an address "1F" in hexadecimal of said program random access memory is usable for one of a Constant-Density Recording (CDR) subroutine in a control program stored in said program random access memory and for an ending condition of said control program.

* * * * *